Figure 6:
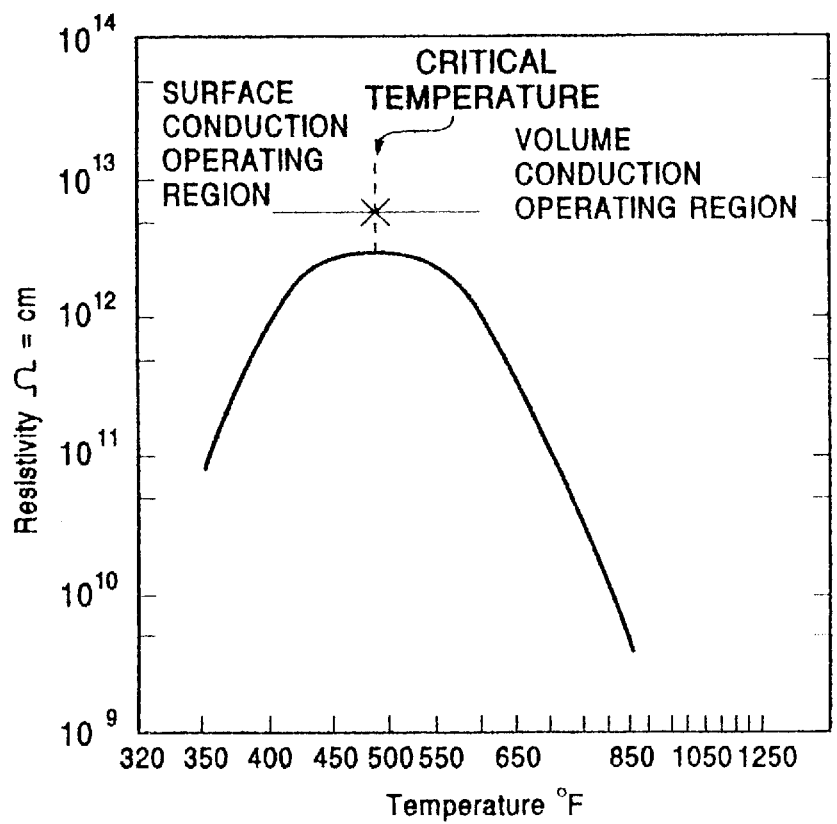

USOO5833736A

United States Patent [19]

Durham et al.

[11] Patent Number: 5,833,736
[45] Date of Patent: Nov. 10, 1998

[54] METHOD FOR REMOVING UNDESIRED PARTICLES FROM GAS STREAMS

[75] Inventors: Michael Dean Durham, Castle Rock; Richard John Schlager, Aurora; Timothy George Ebner, Westminster; Robin Michele Stewart, Arvada; David E. Hyatt, Denver; Cynthia Jean Bustard, Littleton; Sharon Sjostrom, Denver, all of Colo.

[73] Assignee: ADA Environmental Solutions, LLC, Englewood, Colo.

[21] Appl. No.: 907,254

[22] Filed: Aug. 6, 1997

Related U.S. Application Data

[63] Continuation of Ser. No. 483,076, Jun. 7, 1995, abandoned, which is a continuation-in-part of Ser. No. 97,455, Jul. 26, 1993.

[51] Int. Cl.$^6$ .................................................... B03C 3/013
[52] U.S. Cl. ................................ 95/71; 55/341.1; 95/214; 96/53; 96/74
[58] Field of Search .................................... 95/64–66, 71, 95/72, 78, 214, 230; 96/27, 52, 53, 74, 361–364; 55/259, 261, 341.1; 261/116

[56] References Cited

U.S. PATENT DOCUMENTS

| 2,501,436 | 3/1950 | Cleveland et al. ...................... 95/60 X |
| 2,602,734 | 7/1952 | Hedberg et al. ......................... 95/71 X |
| 2,720,939 | 10/1955 | Stokes ......................................... 95/65 |
| 2,746,563 | 5/1956 | Harlow ..................................... 95/73 X |
| 3,058,803 | 10/1962 | Hinkle, Jr. et al. ..................... 423/531 |
| 3,284,900 | 11/1966 | Örne ............................................. 95/59 |
| 3,494,099 | 2/1970 | Eng et al. ............................... 95/64 X |
| 3,523,407 | 8/1970 | Humbert ..................................... 96/19 |
| 3,665,676 | 5/1972 | Mckewen ....................................... 95/4 |
| 3,755,122 | 8/1973 | Melcher et al. ........................ 95/64 X |
| 3,783,158 | 1/1974 | Platzke et al. .......................... 95/66 X |
| 3,807,137 | 4/1974 | Rommel ..................................... 95/72 |
| 3,918,935 | 11/1975 | Livingston ............................ 55/228 X |
| 4,042,348 | 8/1977 | Bennett et al. .................. 423/215.5 X |
| 4,043,768 | 8/1977 | Bennett et al. .................. 423/215.5 X |
| 4,070,424 | 1/1978 | Olson et al. ............................. 261/142 |
| 4,095,962 | 6/1978 | Richards ..................................... 95/65 |
| 4,113,447 | 9/1978 | Bennett et al. .......................... 55/262 |
| 4,123,234 | 10/1978 | Vossos ................................... 95/71 X |
| 4,177,043 | 12/1979 | Albanese ..................................... 95/71 |
| 4,222,748 | 9/1980 | Argo et al. ................................. 95/64 |
| 4,239,504 | 12/1980 | Polizzotti et al. ...................... 95/71 X |
| 4,247,321 | 1/1981 | Persinger ..................................... 71/59 |
| 4,306,885 | 12/1981 | Kober et al. .................... 423/215.5 X |
| 4,325,711 | 4/1982 | Kober et al. ............................... 95/72 |
| 4,541,844 | 9/1985 | Malcolm ..................................... 95/64 |
| 4,738,690 | 4/1988 | Radway et al. ....................... 502/81 X |
| 4,874,402 | 10/1989 | Vogel ..................................... 55/222 X |
| 4,885,139 | 12/1989 | Sparks et al. .......................... 95/65 X |
| 4,888,158 | 12/1989 | Downs ................................. 422/169 X |

(List continued on next page.)

FOREIGN PATENT DOCUMENTS

| 1102109 | 3/1961 | Germany ................................... 95/71 |

OTHER PUBLICATIONS

Krigmont, Coe, Miller and Laudal; "Enhanced ESP Fine Particle Control by Flue Gas Conditioning" EPRI Ninth Particulate Control Symposium, Oct. 15–18, 1991, pp. 1–21.

*Primary Examiner*—Richard L. Chiesa
*Attorney, Agent, or Firm*—Douglas W. Swartz; Sheridan Ross P.C.

[57] ABSTRACT

The present invention discloses a process for removing undesired particles from a gas stream including the steps of contacting a composition containing an adhesive with the gas stream; collecting the undesired particles and adhesive on a collection surface to form an aggregate comprising the adhesive and undesired particles on the collection surface; and removing the agglomerate from the collection zone. The composition may then be atomized and injected into the gas stream. The composition may include a liquid that vaporizes in the gas stream. After the liquid vaporizes, adhesive particles are entrained in the gas stream. The process may be applied to electrostatic precipitators and filtration systems to improve undesired particle collection efficiency.

54 Claims, 8 Drawing Sheets

U.S. PATENT DOCUMENTS

| | | | |
|---|---|---|---|
| 4,908,194 | 3/1990 | Hooper | 423/235 |
| 4,931,073 | 6/1990 | Miller et al. | 95/280 |
| 4,935,209 | 6/1990 | Pfoutz | 422/128 |
| 4,954,324 | 9/1990 | Hooper | 423/239 |
| 4,999,167 | 3/1991 | Skelley et al. | 422/175 |
| 5,032,154 | 7/1991 | Wright | 422/109 |
| 5,034,030 | 7/1991 | Miller et al. | 95/279 |
| 5,066,316 | 11/1991 | Ikeda | 96/52 |
| 5,074,226 | 12/1991 | Lynch | 110/345 |
| 5,106,601 | 4/1992 | Chang et al. | 423/235 |
| 5,196,038 | 3/1993 | Wright | 95/58 |
| 5,240,470 | 8/1993 | Wright | 95/58 |
| 5,261,931 | 11/1993 | Wright | 95/3 |
| 5,284,636 | 2/1994 | Goff et al. | 423/235 |
| 5,288,303 | 2/1994 | Woracek et al. | 95/2 |
| 5,356,597 | 10/1994 | Wright et al. | 95/74 X |
| 5,370,720 | 12/1994 | Duncan | 96/27 X |
| 5,449,390 | 9/1995 | Duncan et al. | 95/72 X |
| 5,547,495 | 8/1996 | Wright | 96/52 X |

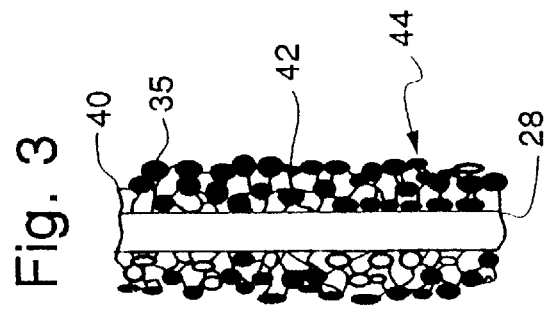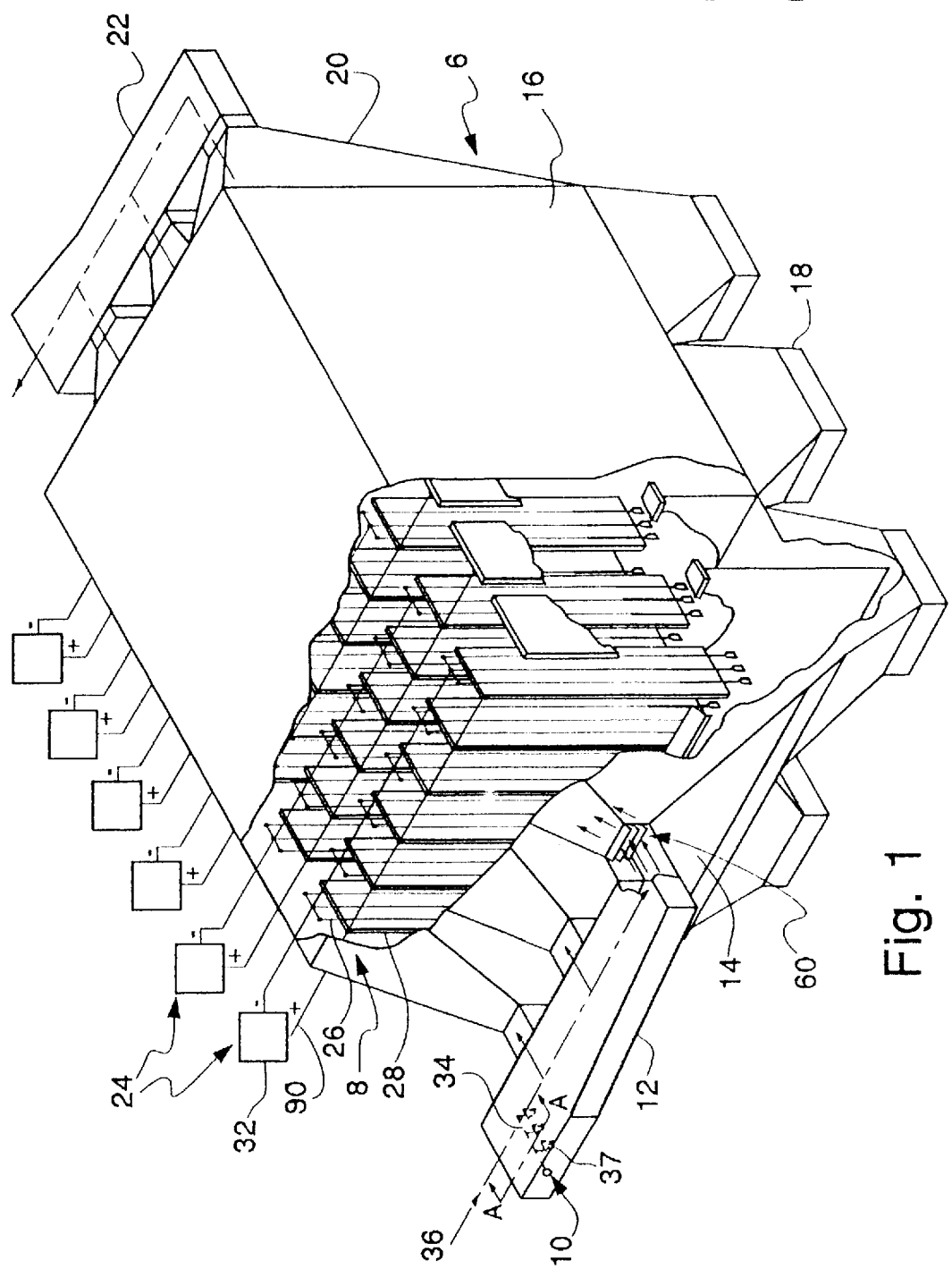

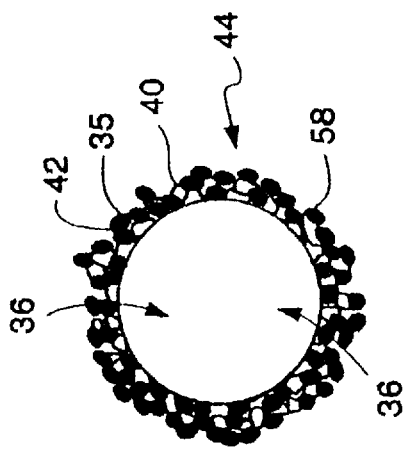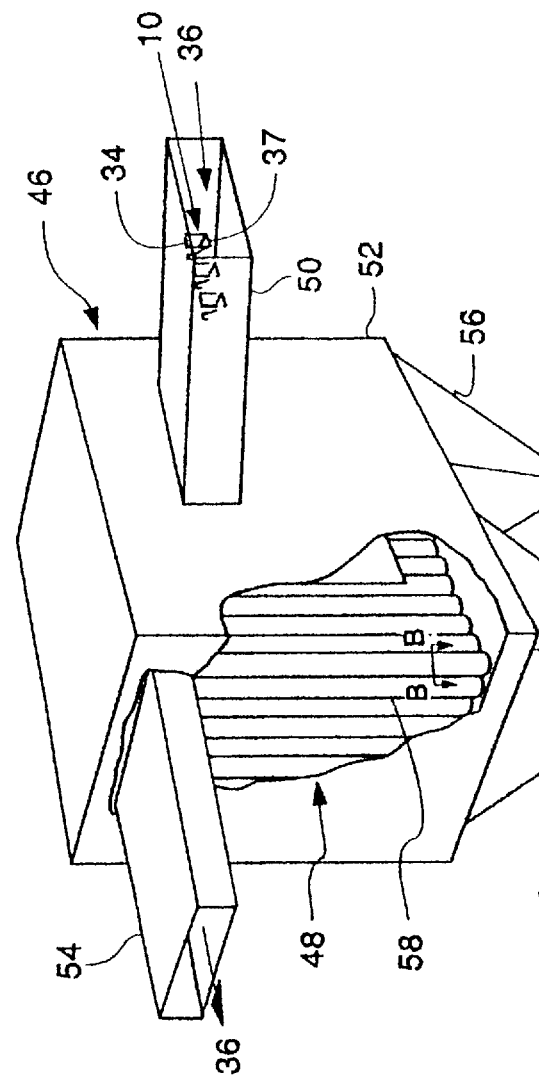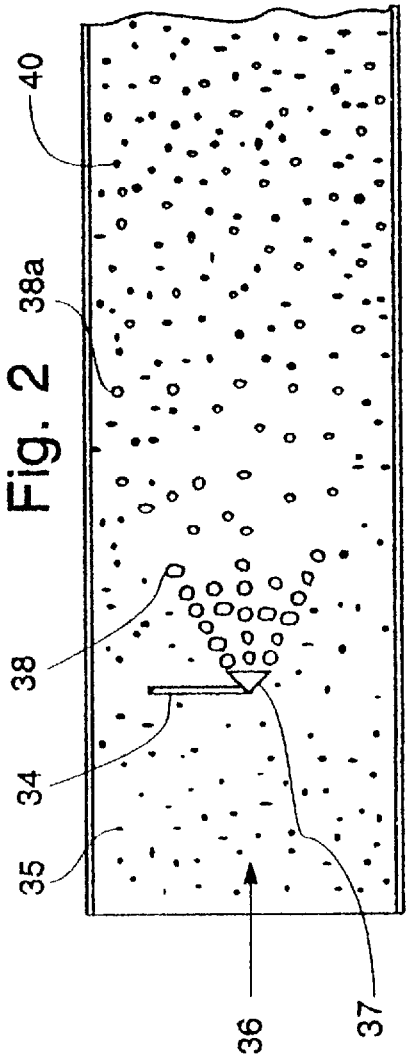

ADDITIVE ADA-23 EFFECT ON FLY ASH RESISTIVITY AS A FUNCTION OF ADDITIVE CONCENTRATION FOR POWDER RIVER COAL AT 300°F

METHOD FOR REMOVING UNDESIRED PARTICLES FROM GAS STREAMS

The present application is a continuation of co-pending application Ser. No. 08/483,076 (now abandoned), filed on Jun. 7, 1995, which is a continuation-in-part of U.S. patent application Ser. No. 08/097,455 for "Method and Apparatus for Decreased Undesired Particle Emissions in Gas Streams", filed Jul. 26, 1993, incorporated herein by this reference in its entirety.

This invention was made with Government support under Contract No. DE-FG02-93ER881500 awarded by the Department of Energy. The Government has certain rights in this invention.

FIELD OF THE INVENTION

The present invention is a method and apparatus for removing undesired particles, such as fly ash, from gas streams. More particularly, the present invention embodies an improved approach for removing such undesired particles by selectively introducing adhesives into the gas stream.

BACKGROUND OF THE INVENTION

Environmental standards for particulate emissions by coal-fired electrical power plants, petroleum refineries, chemical plants, pulp and paper plants, cement plants, and other particulate-emitting facilities are becoming increasingly more demanding. For example, air quality standards in the United States now require power plants to remove more than 99 percent of the fly ash produced by coal combustion before flue gas may be discharged into the atmosphere. As environmental standards tighten, there is a corresponding need for a more efficient means of particulate removal.

Electrostatic precipitators and filtration systems are two commonly used devices for the removal of undesired particles from the gas streams produced by plants and refineries. As used herein, "undesired particles" refers to any particulate matter that is desired to be removed from a gas stream. In electrostatic precipitators, undesired particle-laden gases pass negatively charged corona electrodes which impart a negative charge to the undesired particles. The charged particles then migrate towards positively charged collection plates alternately positioned between the corona electrodes. The undesired particles accumulate on the collection plates and are removed by various techniques, including sonic horn blasts or rapping of the collection plates. Electrostatic precipitators may employ one stage for both the charging and collection of undesired particles or multiple stages with the charging and collection being done in different stages.

Filtration systems, such as baghouses, remove undesired particles from gas streams by passing the gas streams through large filters. The filters have pores large enough to pass the gases in the gas stream but small enough to prevent passage of undesired particles. The filters may be of a fabric, metal, paper or ceramic construction. The undesired particles can be removed from a filter by many techniques including shakers, pulse jets, or reverse gas flow.

In both electrostatic precipitators and filtration systems, efficiency and cost are critical considerations. The efficiency of electrostatic precipitators is decreased by undesired particle reentrainment into a gas stream during the removal of undesired particles from the collection plates. Field studies have shown that as much as 80 percent of the particulate emissions into the atmosphere from electrostatic precipitators result from such reentrainment.

Filtration system efficiency is decreased by the build-up of undesired particles on the filter. Particle build-up clogs filter pores, hindering the passage of the gas stream through the filter, which causes a large pressure drop across the filter. To reduce the pressure drop, the filters require frequent cleaning to reduce the build-up of undesired particles on the filter. The need to frequently clean the filters increases not only operating costs but also undesired particle emissions.

Numerous approaches have been proposed for increasing the efficiency of electrostatic precipitators and filtration systems. In one approach, ammonia gas and sulfur trioxide may be injected into a gas stream to form ammonium sulfates on the surfaces of undesired particles. This approach has several drawbacks. First, a possible product of the reaction between ammonia gas and sulfur gas is ammonium bisulfate which fouls the electrostatic precipitator or filtration system components. Such component fouling impairs the operation of the components and increases undesired particle emissions and unit operating costs. Second, the use of ammonia gas in the gas stream may require additional downstream gas purification steps to remove unreacted ammonia gas from the gas stream prior to discharge. Ammonia gas is known to create environmental damage and increase the opacity of the discharged gas stream. Finally, the odor associated with ammonia may also cause problems in the disposal of the undesired particles after collection.

Another approach to reduce undesired particle emissions is to employ a wetted collection surface. In such "wet systems," a liquid, typically water, is supplied to the collection surface to enhance undesired particle collection and reduce reentrainment. Unless expensive materials are employed, however, components of wet systems can suffer high corrosion rates due to acid formation.

Other approaches to increase electrostatic precipitator and filtration system efficiency similarly require the addition of expensive components to new or existing units and/or otherwise raise other operational complications.

SUMMARY OF THE INVENTION

It is, therefore, an object of the present invention to increase the efficiency of electrostatic precipitators and filtration systems in the removal of undesired particles from a gas stream, preferably without significantly increasing capital and operating costs.

It is a further objective to increase electrostatic precipitator and filtration systems efficiency without the use of toxic additives.

It is a further objective to increase electrostatic precipitator and filtration system efficiency by methods and apparatus that are readily adaptable to existing designs.

It is a further objective to reduce undesired particle reentrainment during removal of undesired particles from a collection surface.

In one aspect of the present invention, a method for removing undesired particles from a gas stream is provided including the steps of (i) contacting a gas stream containing undesired particles and water vapor with an adhesive composition; (ii) collecting the undesired particles and the adhesive composition on at least one collection surface to form an agglomerate at a temperature greater than the condensation temperature of the water vapor in the gas stream; and (iii) removing the agglomerate from the collection surface. As used herein, "adhesive" refers to any substance, inorganic or organic, natural or synthetic, that is capable of adhering or bonding other substances together by surface attachment. "Agglomerate" refers to a cluster or accumulation of undesired particles and adhesive particles. "Condensation temperature" refers to the temperature at which a given vapor component of a gas stream condenses into a liquid under ambient pressure.

Preferably, the adhesive in the composition is nontoxic and substantially odorless. An adhesive is typically deemed "nontoxic" if the presence of the adhesive in the resultant agglomerate does not cause the agglomerate to be environmentally unacceptable under the standards and procedures set forth in the Toxicity Characteristic Leaching Procedure ("TCLP") established by the United States Environmental Protection Agency. The TCLP provides analysis procedures for waste materials to detect environmentally unacceptable levels of substances, including inorganic elements, volatile organic compounds, and semi-volatile organic compounds. The TCLP specifies the maximum acceptable concentration for such substances. An adhesive is deemed to be "odorless" if the presence of the adhesive in the agglomerate cannot be detected by the human nose.

Preferred adhesives are selected from the group consisting of gums, cellulose, vinyls, and derivatives and mixtures thereof. More preferably, the adhesive should be selected from the group consisting of xanthan gum, carboxymethyl cellulose and mixtures thereof. As used herein, "gum" refers to a carbohydrate high polymer that is insoluble in alcohol and other organic solvents, but generally soluble or dispersible in water. "Cellulose" refers to a natural carbohydrate high polymer (polysaccharide) containing anhydroglucose units joined by an oxygen linkage to form long molecular chains. "Vinyls" refers to a polymer having the linkage $CH_2=CH-$ in the polymer chain.

The adhesive composition may include a surfactant to enhance agglomerate formation. The adhesive composition may also include a dispersant to control agglomerate porosity, especially in filtration plant applications. As used herein, "surfactant" refers to any substance that alters the surface tension of another substance. "Dispersant" refers to any substance that influences the distance between undesired particles in the agglomerate.

The adhesive composition is preferably introduced into the gas stream in a dispersed and uniform manner. In this regard, the adhesive composition can be atomized upon introduction utilizing a "carrier fluid" component. The carrier fluid may be a gas or liquid, such as water, that is a solvent for the adhesive and that vaporizes in the gas stream.

After contact with the gas stream, a substantial portion of the carrier fluid, preferably about 90% or more by weight, separates from the adhesive by vaporization prior to reaching the collection surface. Upon separation, dispersed particles of the adhesive will remain in the gas stream with the undesired particles. Upon contact with the collection surface, the adhesive particles and the undesired particles to be removed form the agglomerate. Preferably, to yield a substantially "dry system," the temperature of the collection surface in the collecting step is greater than both the condensation temperature of the water vapor in the gas stream and any vaporized carrier fluid. As used herein, a "dry system" refers to a system that employs a substantially dry collection surface (i.e., having substantially no liquid in contact therewith) for undesired particles.

The gas stream may be advantageously deflected, as may be desired, prior to contacting the collection surface to achieve, for example, uniform incidence of the particles on the collection surface, thereby yielding an agglomerate of a more uniform thickness.

After a predetermined build-up, the agglomerate of undesired particles and adhesive particles may be removed from the collection surface, collected in a hopper and removed from the unit. Removal may be accomplished by vibration of the collection surface, removing the collection surface from the collection zone, or contacting the collection surface with a reverse gas stream having a direction of flow substantially opposite to the gas stream.

In a related aspect of the invention, an apparatus for undesired particle removal is disclosed that includes (i) a housing; (ii) an inlet and outlet for the gas stream; (iii) an injection apparatus to inject an adhesive composition into the gas stream; and (iv) one or more collection surfaces supportably positioned within the housing to collect both the undesired particles to be removed and adhesive particles which, in turn, form an agglomerate on the collection surface. The apparatus may include a plurality of collection surfaces and one or more hoppers to collect the agglomerate that is removed from the collection surface.

The adhesive injection apparatus is preferably a plurality of dispersion devices (e.g., nozzles) positioned within and/or across the gas stream to uniformly disperse the adhesive composition into the gas stream. The adhesive injection apparatus may be advantageously located upstream of the collection surface at a distance sufficient for a substantial portion of any carrier fluid, preferably about 90% or more by weight, to separate by vaporization from the particles before the particles contact the collection surface. A deflecting apparatus may be provided to deflect and uniformly distribute the gas stream prior to contacting the collection surfaces so as to improve the uniformity of agglomerate build-up on the collection surfaces. Such deflecting apparatus may comprise, for example, a plurality of selectively adjustable baffles (e.g., horizontally, vertically, and/or angularly) disposed across the gas stream.

In an electrostatic precipitator embodiment of the present invention, the apparatus may include a power supply; at least one electrode connected to the negative terminal of the power supply and positioned relative to the input gas stream to impart a charge to the undesired particles to be removed and the adhesive particles; and at least one collection surface connected to the positive terminal of the power supply and positioned parallel to the flow of the gas stream. To enhance agglomerate formation, electrostatic injection nozzles (such as charged-fog nozzles or those employed in many paint sprayers) may be employed to inject the adhesive composition. That is, the use of such nozzles may serve to impart additional charge to adhesive composition droplets upon atomization, thereby increasing the collection of adhesive particles on the collection surfaces, particularly if an anionic or nonionic adhesive is utilized. To lower the electrical resistivity of the agglomerate formed on the collection surface, and thereby reduce sparkover or back corona discharge, the carrier fluid in the adhesive composition may also be advantageously utilized to cool the gas stream and undesired particles contained therein. For such purposes, the predetermined injection rate is preferably selected to achieve a desired degree of cooling, while yet allowing for a substantial portion of the carrier fluid to vaporize before reaching the collection surface. It is believed that such an approach may have particular application in low-sulphur content coal burning facilities in view of the relatively low acid dew point of the resulting gas streams.

In a filtration system embodiment of the present invention, the collection surface may be a filter located transverse to the direction of flow of the gas stream to separate the undesired particles and adhesive particles from the gas stream. Such filter may be of ceramic, fabric, paper or metal construction. Preferably, the adhesive injection apparatus and/or filter are selected such that a substantial portion of the adhesive particles dispersed into the gas stream are larger than the pore size of the filter.

In another aspect of the present invention, a process for removing undesired particles from a gas stream is provided that includes the following steps: (i) contacting a gas stream with a plurality of droplets comprising phosphoric acid and a carrier fluid, with the droplets having a first Sauter Mean Diameter ranging from about 20 to about 150 microns; (ii) separating the carrier fluid from the droplets, such as by evaporation, to reduce the droplet size to a second Sauter Mean Diameter less than said first Sauter Mean Diameter; and (iii) collecting the undesired particles and phosphoric acid on a collection surface to form an agglomerate. After separation of the carrier fluid from the phosphoric acid, the second Sauter Mean Diameter ranges from about 1 to about 10 microns. The preferred concentration of phosphoric acid in the gas stream ranges from about 1 to about 10 lb/ton of undesired particles. The residence time of the droplets in the gas stream before the collecting step preferably ranges from about 0.25 to about 2.00 seconds.

In a filtration system embodiment, a process is provided that first contacts a gas stream with a caustic acid and/or salt or precurser thereof, preferably a phosphorous-containing material, and second contacts the undesired particles with a filtration surface to form an agglomerate of undesired particles on the filtration surface. The caustic acid and/or salt or precursor thereof, and particularly the phosphorous-containing material, cause an increase in the cohesiveness of the undesired particles and thereby facilitate agglomerate formation. The phosphorous-containing material preferably includes phosphoric acid, elemental phosphorous, and precursors and mixtures thereof. In the first contacting step, the phosphorous-containing material preferably causes the deposition of phosphoric acid on the undesired particles.

In a hot-side electrostatic precipitating system embodiment, a process is provided that first contacts a gas stream with a resistivity reduction agent and collects the undesired particles and resistivity reduction agent on a collection surface of the electrostatic precipitating device to form an agglomerate. The temperature of the gas stream at the electrostatic precipitating device is no less than about 600° F. The electrostatic precipitating device is located upstream of the air preheater in utility applications. The resistivity reduction agent preferably is a caustic acid and more preferably is phosphoric acid and precursors thereof. The preferred phosphoric acid concentration ranges from about 0.1 to about 1.0% by weight of the undesired particles in the gas stream.

The present invention has numerous advantages over existing methods and apparatus. Electrostatic precipitator and filtration system efficiency are increased by less reentrainment of undesired particles. The adhesive particles increase the force of attraction between undesired particles in the agglomerate of undesired particles and adhesive particles. The resulting agglomerate of undesired particles and adhesive particles on the collection surface, or dust cake, is not only more cohesive but also more porous. In electrostatic precipitators, the cohesiveness of the dust cake reduces fragmentation and undesired particle reentrainment during dust cake removal. The resistivity of the resulting dust cake can also be reduced through the use of phosphoric acid resulting in better collection of the undesired particles, relative to untreated particles. In filtration systems, the particle cohesion produces increased porosity of the dust cake which reduces the pressure drop across the filter (and therefore requires less frequent filter cleanings). The cohesiveness of the dust cake also reduces "bleeding" of very fine undesired particles through the filter pores caused by compaction of undesired particles on the filter surface, thus increasing efficiency.

The present invention is also particularly advantageous as it preferably yields a "dry system," which has numerous advantages relative to a wet system.

Additionally, the method not only employs low cost components and additives that improve the efficiency of new electrostatic precipitators and filtration systems but also is readily adaptable to existing units. Further advantages will be apparent to those skilled in the art.

BRIEF DESCRIPTION OF THE DRAWINGS

FIG. 1 is a perspective view of a first embodiment of the present invention in an electrostatic precipitator;

FIG. 2 is a cut away view along line A—A of FIG. 1 showing the adhesive injection device spraying droplets of an adhesive composition into the gas stream;

FIG. 3 is a side view of a collection plate showing an accumulation of adhesive particles and undesired particles on the collection plate;

FIG. 4 is a perspective view of a second embodiment of the present invention in a filtration system;

FIG. 5 is a cut away view along line B—B of FIG. 4 showing an accumulation of adhesive particles and undesired particles on the filter surface;

FIG. 6 is a graph showing the relationship between particle temperature and particle resistivity for typical flyash particles;

FIG. 7 is a plot of relative phosphoric acid concentration (based on a percent by weight of additive relative to undesired particles in the gas stream) against resistivity for a gas stream having a temperature of 300° F.;

FIG. 8 is a plot of relative phosphoric acid concentration (based on a percent by weight of additive relative to undesired particles in the gas stream) against rate of agglomerate formation;

FIG. 9 is a plot of relative phosphoric acid concentration (based on a percent by weight of additive relative to undesired particles in the gas stream) against resistivity;

FIG. 10 is a plot of phosphoric acid concentration (based on a percent by weight of additive relative to undesired particles in the gas stream) against resistivity; and FIG. 11 is a plot of phosphoric acid concentration (based on a percent by weight of additive relative to undesired particles in the gas stream) against resistivity under hot-side conditions.

DETAILED DESCRIPTION

FIGS. 1 and 2 depict a first embodiment of the present invention as implemented in an electrostatic precipitator for removal of undesired particles such as fly ash from a gas stream. The electrostatic precipitator comprises housing assembly 6, precipitating assembly 8, and adhesive injection assembly 10. The housing assembly 6 includes an input duct 12, one or more input plenums 14, shell 16, one or more hoppers 18, one or more output plenums 20, and output duct 22.

The precipitating assembly 8 includes a plurality of sections 24. Each section 24 includes a plurality of alternately disposed discharge electrodes 26 and collection plates 28, a corresponding plurality of electrical conductors 30, and an interconnected power supply 32. The negative and positive terminals of the power supply 32 are connected to the discharge electrodes 26 and collection plates 28, respectively.

The adhesive injection assembly 10 includes a reservoir (not shown) and an interconnected feed line 34 and plurality of nozzles 37. As will be appreciated, the gas stream may be contacted with an adhesive composition continuously or intermittently and by many different methods. Adhesive injection assembly 10 achieves contacting by atomizing a composition comprising a carrier fluid and an adhesive into the gas stream 36 in the form of droplets 38. Atomization may be realized by a number of different methodologies, including spraying the composition through a nozzle. To enhance charging of the droplets, particularly if an anionic or nonionic adhesive is employed, electrostatic injection nozzles may be utilized. While preferred, a carrier fluid is not required to disperse adhesive particles in gas stream 36. By way of example, adhesive particles 40 may be simply dripped into gas stream 36 by a suitable device (e.g., drip emitters).

As illustrated, adhesive injection assembly 10 should be located upstream of the precipitating assembly 8. Preferably, the adhesive injection assembly 10 is disposed so as to provide a sufficient distance between the adhesive injection assembly 10 and the nearest of the collection plates 28 such that, prior to contacting the nearest collection plate 28, a substantial portion of the carrier fluid, preferably about 90% or more by weight, has separated from the adhesive and a substantially uniform dispersion of adhesive particles across the gas stream 36 has been attained. To accomplish this, adhesive injection assembly 10 may be advantageously located in input duct 12 with nozzles 37 evenly spaced across and within the gas stream 36 as illustrated.

Gas stream 36 may be deflected by baffles 60 prior to contacting collection plates 28 to achieve a more uniform incidence of undesired particles 35 and adhesive particles 40 on collection plates 28, thereby yielding an agglomerate of a more uniform thickness on collection plates 28.

Adhesives utilized in the present invention should be nontoxic, substantially odorless, and soluble in a suitable fluid carrier, such as water. Further, the adhesives preferably should be organic compounds, such as polymers. Preferred classes of polymers are gums, cellulose, vinyls and derivatives and mixtures thereof. For polymer adhesives, generally, the desired droplet size 38 upon injection of the adhesive composition via nozzles 37 is from about 10 to about 100 micrometers.

It is believed that the ionic characteristics of the molecules of the adhesive utilized can impact the performance of the present invention. That is, in electrostatic precipitator applications, adhesives that are anionic and nonionic may be preferable since they are believed to more readily accept a negative charge from electrodes 26 than cationic molecules. Consequently, it is theorized that anionic and nonionic molecules will more readily collect on collection plates 28 than cationic molecules, thereby enhancing agglomerate formation.

In operation, gas stream 36 containing undesired particles 35 is passed through input duct 10 and input plenums 14 into electrostatic precipitator shell 16. Prior to entering electrostatic precipitator shell 16, gas stream 36 passes adhesive injection assembly 10. Adhesive injection assembly 10 disperses droplets 38 containing adhesive particles 40 into gas stream 36.

As noted above, the contacting of the adhesive with the gas stream may be facilitated by use of a carrier fluid. The carrier fluid may be any gas or liquid that is nontoxic, substantially odorless, and capable of transporting the adhesive over a desired distance. Additionally, in the case of a liquid carrier fluid, the carrier should be a solvent for the adhesive utilized. Preferably, the carrier fluid is a liquid, such as water, that readily vaporizes at the temperature and pressure to which the gas stream is subjected.

The specific desired concentration of the adhesive in the liquid carrier fluid primarily depends on the identity of the carrier fluid, the desired size and amount of adhesive particles 40 to be introduced into the gas stream 36, and the size of the droplet 38 to be injected in the gas stream 36. In general, however, the concentration of adhesive in the carrier fluid (e.g., water) preferably ranges from about 0.005% to about 10% by volume, and more preferably from about 0.05% to about 1% by volume. Lower concentrations may for example be employed in low-sulphur content coal burning applications where, in addition to adhesive particle dispersal, the carrier fluid is advantageously employed to cool the gas stream, thereby reducing the resistivity of the agglomerate and the incidence of sparkover. The adhesive composition should be thoroughly mixed prior to injection into gas stream 36.

The specific desired concentration of the adhesive particles 40 to be dispersed in gas stream 36 is established primarily based upon the concentration and size distribution of undesired particles 35 in gas stream 36, the tacticity of the adhesive, and the desired concentration of undesired particles 35 in gas stream 36 after treatment. In general, however, the concentration of adhesive particles 40 relative to undesired particles 35 in gas stream 36 preferably ranges from about 0.01% to about 1% by weight.

After the droplets 38 are injected into gas stream 36, droplets 38 are carried downstream by gas stream 36. As the droplets 38 are carried downstream, droplets 38 decrease in size due to vaporization of the liquid carrier fluid and become smaller droplets 38a. As the liquid carrier fluid vaporizes, adhesive particles 40 formerly contained in droplets 38, 38a, will be dispersed and entrained in gas stream 36 along with undesired particles 35. As noted, about 90% or more by weight of the liquid carrier fluid in a given droplet 38 has preferably evaporated before adhesive particles 40 contact collection plates 28.

The desired size distribution of adhesive particles 40 produced after vaporization of the liquid carrier fluid is a function of several factors including the size distribution of undesired particles 35, the density of the adhesive, and the viscosity of the adhesive. Preferably, however, the size of the adhesive particles 40 ranges from about 1 to about 10 micrometers.

The vaporization time for the liquid carrier fluid in a droplet 38 primarily depends upon the size of droplet 38, the volatility of the liquid carrier fluid, and the temperature, pressure and composition of the gas stream 36. In general, however, the preferable vaporization time for the liquid carrier fluid should be less than about two seconds and in most cases less than about 1 second.

After vaporization of the liquid carrier fluid, the adhesive particles 40 contact collection plates 28. The temperature of both the collection plate surface and the agglomerate of undesired particles 35 and adhesive particles 40 collected on the surface is preferably above the condensation temperature of water vapor in gas stream 36. Further, the temperature of both the collection plate surface and the agglomerate is preferably above the condensation temperature of the vaporized liquid carrier fluid.

Gas stream 36 containing undesired particles 35 and dispersed adhesive particles 40 enters electrostatic precipitator shell 16. Discharge electrodes 26 impart a negative electrical charge to undesired particles 35 and adhesive particles 40. The negatively charged particles adhere to the positively charged collection plates 28. As the input gas stream moves from upstream section 24 to downstream section 24, an increasing percentage of undesired particles 35 and adhesive particles 40 accumulate on collection plates 28.

FIG. 3 is a side view of a portion of a collection plate 28 that contains an agglomerate of undesired particles 35 and adhesive particles 40. As depicted, after contacting collection plate 28 adhesive particles 40 flow into the interparticle gaps between undesired particles 40, thereby yielding the desired agglomerate. Surfactants may be included in the adhesive composition and, upon contacting the collection plates, will serve to reduce the surface tension of adhesive particles 40 and increase the ability of the adhesive to fill the gaps between undesired particles 35. Useful surfactants in this regard include alkyl aryl polyether and alkyl phenylhydroxypolyoxyethylene.

FIG. 3 further depicts void spaces 42 which result from the cohesion between undesired particles 35 and adhesive particles 40. As illustrated, the resulting dust cake 44 is a porous agglomerate of undesired particles 35 and adhesive particles 40. The porosity of dust cake 44 may be desirably increased by the addition of a dispersant to the adhesive composition employed. Useful dispersants in this regard include phosphates, such as trisodium phosphate, tetrasodium phosphate, and sodium hexamitaphosphate.

While not wishing to be bound by any theory, it is believed that the bonding mechanism between the adhesive particles 40 and undesired particles 35 is mechanical and/or ionic in nature. Regarding mechanical bonding, it is believed that longer polymer chains more efficiently attract and entrap fine undesired particles 35 when compared to shorter polymer chains in the adhesive molecules. For this reason, higher molecular weight adhesive polymers more effectively form clumps of fines in the dust cake 44 than lower molecular weight adhesive polymers. Regarding ionic bonding, it is believed that the polarity of the polymer impacts the ability of the adhesive molecules to bond to undesired particles 35.

Referring to FIGS. 1–3, dust cake 44 can be removed from collection plate 28 by many techniques, including rapping of the collection plate 28 and sonic horns. The preferred methodology for dust cake removal involves vibration of the collection plate 28. When collection plate 28 is vibrated, dust cake 44 separates from collection plate 28 in large sheets and falls into hoppers 18 for disposal. It is believed that adhesive particles 40 increase the attractive force between undesired particles 35. The increased interparticle forces of attraction induce a high degree of cohesiveness in dust cake 44. The high dust cake cohesiveness is thought to prevent the release of finer undesired particles during dust cake removal.

Compared to the dust cakes formed in conventional electrostatic precipitators, the cohesiveness of dust cake 44 yields many advantages. First, as noted above the cohesiveness of dust cake 44 causes dust cake 44 to form large, consolidated sheets during dust cake removal and therefore reduces the fragmentation of dust cake 44 and reentrainment of undesired particles 35 during dust cake removal. The decreased incidence of undesired particle reentrainment in the present invention reduces particulate emissions relative to conventional electrostatic precipitators. Second, the cohesive sheets also reduce problems of conventional electrostatic precipitators from handling and storing loosely consolidated, fine undesired particles. Undesired particles 35 are typically only about 10 microns in size. Finally, the vaporization of the majority of the liquid carrier fluid before dust cake formation produces a solid mass that avoids problems commonly associated with slurry handling and disposal.

A second embodiment of the present invention is a filtration system for removal of undesired particles, such as fly ash from a gas stream. Referring to FIGS. 2, 4 and 5, a filtration system 45 includes a housing assembly 46, filtrating assembly 48, and adhesive injection assembly 10. Housing assembly 46 includes an input duct 50, filtration shell 52, output duct 54, and hoppers 56. Filtrating assembly 48 includes a plurality of filters 58 suspended from a header (not shown). A support apparatus (not shown), such as a cage, may be used to prevent deflation of filters 58. Again, adhesive injection assembly 10 includes a reservoir (not shown), feed line 34, and nozzles 37.

In operation, gas stream 36 enters the filtration shell 52 through the input duct 50. Before gas stream 36 contacts filters 58, adhesive composition droplets 38 are injected into gas stream 36. Preferably, by the time gas stream 36 contacts filters 58 a substantial portion of the liquid carrier fluid, preferably about 90% or more by weight, in droplets 38 has vaporized, and adhesive particles 40 are dispersed. Filters 58 pass the gaseous components of gas stream 36 but remove undesired particles 35 and adhesive particles 40. As will be appreciated, filters 58 may be of ceramic, fabric, paper or metal construction.

As shown in FIG. 5, undesired particles 35 and adhesive particles 40 collect on the exterior of filter 58. As in the above discussion, void spaces 42 are formed as undesired particles 35 and adhesive particles 40 collect on the exterior of filter 58. Compared to conventional filtration systems, void spaces 42 substantially reduce the incidence of undesired particles 35 blocking the filter pores. As noted above, such blockages cause a large pressure drop across the filter and necessitate frequent removal of dust cake 44 from filter 58. The porous dust cakes 44 of the present invention reduce the pressure drop across filters 58 and therefore filters 58 require less frequent cleanings. Accordingly, the present invention has a lower incidence of undesired particle reentrainment in gas stream 36 than conventional filtration plants. Compared to conventional filtration plants, the formation by undesired particles 35 and adhesive particles 40 of a cohesive agglomerate reduces the incidence of very fine undesired particles 35 "bleeding through" filter pores and becoming reentrained in gas stream 36 and this results in increased collection efficiency.

As will be appreciated, a number of methodologies exist to remove dust cake 44 from filters 58 including shaker-cleaning filters, shake-deflate filters, sonic-horns, pulse-jet-cleaned filters, and reverse-air-cleaned filters. In each case, a mechanism for cleaning the filters is vibration and the dust cake 44 falls into hoppers 56 for collection. Filters 58 may also be removably mounted to the header so that they may be removed, cleaned, and reinstalled.

The cohesiveness of dust cake 44 facilitates the dust cake's removal. As a result of the increased interparticle cohesion induced by adhesive particles 40, dust cake 44 remains in consolidated chunks after removal. The formation of consolidated chunks of dust cake 44 simplifies the handling and storing of undesired particles when compared to conventional filtration systems.

After passing through filter 58, gas stream 36 flows from the filtration shell 52 to output duct 54 for additional treatment or disposal.

In a third embodiment of the present invention, the additive is the inorganic compound, phosphoric acid, which increases the cohesiveness of undesired particles and decreases undesired particle resistivity. Phosphoric acid is relatively inexpensive compared to many other additives. It not only improves particle cohesion on the collection plates and filters, as noted above for organic adhesives, but also reduces the resistivity of the undesired particles 35, thereby further improving the particle removal efficiency of the electrostatic precipitator. The reduced resistivity reduces the incidence of sparkover in an electrostatic precipitator resulting in increased electric field strengths and current densities. Phosphoric acid can also be used to improve undesired particle collection efficiencies in undesired particle collection systems having nozzle systems already disposed in the gas stream, such as manufacturing facilities in the metallurgical industry.

While not wishing to bound by any theory, it is believed that the phosphoric acid reacts with chemical compounds in the gas stream and/or undesired particles to form a hydrophilic material. It is believed that the hydrophilic material reacts with water in the gas stream to form hydrates. The hydrated compounds not only reduce undesired particle resistivity but also increase undesired particle cohesiveness.

The effectiveness of droplets of phosphoric acid in reducing undesired particle emissions is surprising and unexpected. As noted below, phosphoric acid has virtually no vapor pressure until around 1,400 to 2,000 degrees fahrenheit and therefore will condense at the gas stream temperatures commonly encountered in utility and other applications. Under these conditions, one would not expect that droplets of phosphoric acid, especially in the small concentrations used in the present invention, would impact the emissions of undesired particles because the phosphoric acid would not vaporize and uniformly coat the undesired particles if introduced in droplet form. Accordingly, one would not expect that the phosphoric acid would disperse sufficiently in the undesired particles to impact particulate emissions. This result is therefore surprising and unexpected based upon the teachings of the prior art. Additionally, there would be a disincentive in introducing the phosphoric acid into the duct in the form of droplets due to the possibility of the droplets coating the duct, causing corrosion and gumming up equipment.

The specific desired concentration of the phosphoric acid in the liquid carrier fluid preferably ranges from about 0.1 to about 5.0% by volume, more preferably from about 0.10 to about 2.0% by volume, and most preferably from about 0.10 to about 1.5% by volume. The preferred carrier fluid has a boiling point less than the temperature of the gas stream to ensure rapid evaporation of the carrier fluid from the phosphoric acid. The preferred carrier fluid is water. The phosphoric acid is preferably thoroughly mixed with the carrier fluid to form a fluid composition before injection into the gas stream 36. In one embodiment, an adhesive is included in the amounts noted above.

Because phosphoric acid is a caustic acid, it is important to utilize a small droplet size to entrain the droplets in the gas stream and thereby substantially minimize the contact of the acid with exposed metal surfaces to prevent corrosion of the surfaces. In utility applications, the injection of the acid upstream of the air preheater can result in undesired particle deposits on the air preheater surfaces which can gum up the preheater and decrease the amount of heat transferred to the boiler. The reduced heat transfer can decrease the efficiency of the boiler. Preferably, before separation of the carrier fluid from the adhesive the droplets 38 have a Sauter Mean Diameter ranging from about 20 to about 100 microns and more preferably from about 20 to about 50 microns. After separation of the carrier fluid from the phosphoric acid, the droplets have a Sauter Mean Diameter preferably ranging from about 1 to about 10 microns. Droplets in this size range will be entrained in the gas stream and not settle out of the gas stream on the input duct and other metal surfaces.

To produce a small droplet size, the nozzles 37 of the adhesive injection assembly 10 are preferably dual fluid nozzles. In nozzles of this type, a pressurized gas, such as air or steam, is intermixed with the fluid composition containing the phosphoric acid at the injection interface to form atomized droplets 38 of an extremely small size.

The small droplets are injected a sufficient distance upstream of the electrostatic precipitator or baghouse to permit effective conditioning of the gas stream. Preferably, the residence time of the droplets in the gas stream before contacting the electrostatic precipitator or baghouse ranges from about 0.25 to about 2.00 seconds.

The droplets should be substantially uniformly distributed throughout the input duct for best results. This result is effectuated by proper placement of the nozzles 37 in the input duct. It is also important to position the nozzles 37 such that the droplet dispersion pattern does not overlap with adjacent metal surfaces, such as the input duct.

The ability of the phosphoric acid to condition the undesired particles is not particularly temperature dependent. For best results, however, it is preferred that the gas stream temperature range between about 212° to about 932° F.

For electrostatic precipitators, the fluid composition is preferably not heated before injection into the gas stream 36. In this manner, the droplets 38 absorb thermal energy from the gas stream 36 and thereby act as a heat sink. Under cold-side operating conditions (e.g., at temperatures less than about 350° F.), the subsequent cooling of the gas stream 36 can further reduce the resistivity of the agglomerate and the incidence of sparkover for electrostatic precipitators.

The concentration of phosphoric acid in the input duct depends upon the type of particle removal device. For an electrostatic precipitator, the amount of phosphoric acid used in the gas stream preferably ranges from about 1 to about 10 lb/ton of undesired particles. For a gas filtration device, such as a baghouse, the amount of phosphoric acid used in the gas stream preferably ranges from about 0.5 to about 6.0 lb/ton of undesired particles.

The phosphoric acid is preferably contacted with the gas stream as a liquid and not as a vapor. Vaporized phosphoric acid is likely to condense on the input duct and other metal surfaces, causing corrosion and gumming up equipment. As will be appreciated, phosphoric acid has virtually no vapor pressure until around 1400° to 2000° F. and therefore will condense at the gas stream temperatures commonly encountered in utility and other applications (e.g., 180° to 800° F.). Vaporized phosphoric acid is much more sensitive to the surface chemistry of the undesired particles than droplets of a fluid composition containing phosphoric acid. In contrast, droplets of the fluid composition are not as sensitive to surface chemistry. When in the agglomerate, the droplets of the fluid composition readily spread out through the agglomerate due to capillary forces. Another approach to contacting phosphoric acid with the undesired particles is to combust phosphorous and inject vaporized phosphorous into the gas stream. The vaporized phosphorous condenses onto the undesired particles and can form phosphoric acid. Phosphorous, however, is highly flammable when exposed to oxygen and is therefore dangerous to handle and costly to transport. Additionally, vaporized phosphorous can condense in the gas stream and form extremely small particles, e.g., less than 1 micron in size, which can bypass an electrostatic precipitator and cause an acid fume.

In a fourth embodiment of the present invention, the gas stream has a temperature of preferably no less than about 350°, more preferably no less than about 400°, and most preferably no less than about 450° F. at an electrostatic precipitating device and is contacted with a resistivity reduction agent and, optionally, a carrier fluid. As used herein, a resistivity reduction agent is any additive that causes a reduction in undesired particle resistivity in the surface conduction operating region. This region lies to the left of the critical temperature as illustrated in FIG. 6. The resistivity reduction agent and precursors and mixtures thereof preferably include caustic acids and salts thereof, and more preferably phosphoric acid and precursors and mixtures thereof. Preferably, the resistivity reduction agent is substantially free of ammonia and sodium. The preferred concentration of the phosphoric acid in the gas stream preferably ranges from about 0.1 to about 1.0% by weight of the undesired particles and more preferably is about 0.5 weight percent of the undesired particles in the gas stream.

This embodiment is particularly applicable to hot-side electrostatic precipitating devices in utility applications which operate at gas stream temperatures typically in excess of 600° F. and more typically in excess of 1500° F. Such devices can exhibit back corona tendencies in the agglomerate located on the collection plates. While not wishing to be bound by any theory, it is believed that such back corona tendencies result from the increase in undesired particle resistivities caused by prolonged exposure to the gas stream. It is often difficult to remove all of the agglomerate and, as a consequence, a portion of the agglomerate can remain on the collection plates for prolonged periods. The resistivity reduction agent is believed to reduce the resistivities in the undesired particles in the agglomerate, thereby decreasing or eliminating the occurrence of back corona.

The use of a resistivity reduction agent under hot-side electrostatic precipitating conditions is surprisingly effective. It is believed that under hot-side conditions, charged carriers pass through the undesired particles on the collection plates. This mechanism is referred to as volume conduction and the volume conduction operating region is illustrated in FIG. 6. In this region, the undesired particle resistivity is inversely related to undesired particle temperature. In contrast, under cold-side conditions (e.g., at temperatures no more than about 500° F.), the charged carriers are believed to travel along the surface of the undesired particles and not through the undesired particles. This mechanism is known as surface conduction and the surface conduction operating region is illustrated in FIG. 6. In this region, the undesired particle resistivity is directly related to undesired particle temperature. Surprisingly, it has been discovered that resistivity reduction agents, especially those described herein, are effective under hot-side conditions in reducing resistivity. This is surprising because other surface resistivity modifying agents, such as sulfuric acid, have been shown to be ineffective under hot-side operating conditions. As will be appreciated, hot-side electrostatic precipitating devices in utility applications are located upstream of the air preheater while cold-side electrostatic precipitating devices are located downstream of the air preheater.

In a fifth embodiment of the present invention, the gas stream is contacted with an adhesive composition including phosphoric acid, an adhesive, and a carrier fluid. The adhesive can be any of the adhesives, preferably organic, noted above with respect to the first embodiment. The adhesive composition is injected into the gas stream as a plurality of droplets, with the carrier fluid separating from the adhesive and phosphoric acid. The droplets of adhesive and phosphoric acid contact the undesired particles and assist in formation of the agglomerate. This embodiment has the advantage of combining the dual abilities of phosphoric acid to act as an adhesive and a resistivity reducer with the cohesive nature of the adhesive.

EXAMPLE 1

Tests of sodium carboxymethylcellulose ("Adhesive A"), and xanthan gum ("Adhesive B") were conducted using a 100-acfm dry electrostatic precipitator drawing flue gas from a 1.5 million BTU/hr combustor. Insitec analyzers were installed in the input and output ducts of the electrostatic precipitator to measure undesired particle collection efficiency. The electrostatic precipitator was "lined-out" to operate at 10–12 kV at a current density of 0.5–1.5 mA. The adhesives were dissolved in water at a concentration of about 0.1% by weight. The solutions were injected into the gas stream through spray nozzles. The Sauter mean diameter of the droplets of the sprayed composition was about 15 microns.

Tests were run using Adhesive A at concentrations of adhesive in the gas stream of approximately 0.05% and 2.5% (wt additive/wt undesired particles). A decrease in undesired particle loading in the outlet of the electrostatic precipitator was observed for the additive at the 0.05% concentration. An increase in the undesired particle loading leaving the electrostatic precipitator was observed during the injection of the 2.5% concentration. Adhesive B was injected at a concentration of 0.05% and was also found to decrease undesired particle loading at the electrostatic precipitator outlet.

The electrostatic precipitator was modified by the installation of baffles at the input and output ducts to distribute the flow of the gas stream more uniformly through the active portions of the electrostatic precipitator. The modification improved electrostatic precipitator efficiency from approximately 50% to over 70%. After the modification, Adhesive A was injected at a rate to produce a concentration of 0.05% (wt additive/wt undesired particles). Efficiency improved from about 73% to about 83%. In other words, Adhesive A decreased undesired particle emissions by about 39%. Rapping the collection plates established that the dust cake would dislodge in "flakes". Undesired particle buildup did not prove any more severe than buildup without adhesive present.

EXAMPLE 2

A mixture of phosphoric acid and corn syrup, an organic adhesive, was injected into an experimental device to determine the effectiveness of the additives to remove undesired particles from a simulated flue gas stream. In the device, the simulated flue gas stream was passed though an additives injection chamber and then through a resistivity measurement chamber. Both undesired particles (e.g., fly ash) and other flue gas constituents were added dynamically to create the representative gas composition and undesired particle content. The moisture content of the flue gas was maintained at 10% by volume with a temperature-controlled humidifier upstream of the additives chamber. In the chamber, the additives were sprayed into the flow with a fine mist atomizer. The additive volume injected through the injection nozzle was controlled with a precision peristaltic pump. The simulated flue gas stream contained undesired particles that were added to the flow by a screw feeder with the injection rate being controlled by a variable speed motor. Entrained undesired particles were collected downstream of the additive injection chamber in a resistivity apparatus, e.g., a modified point-plane electrostatic precipitator. In the resistivity cell, an agglomerate was collected by either electrical precipitation or by filtering across an electrically isolated metal frit. The resistivity of the agglomerate was measured by first determining the thickness of the agglomerate, then by applying a measured voltage and current across the agglomerate. Voltage/current measurements were taken on an ascending voltage curve with results being calculated at a uniform field strength of 4 kV/cm.

Two parameters were varied to determine the impact of the phosphoric acid on undesired particle resistivity. Tests were run over an extended flue gas temperature range of 200°–450° F. The phosphoric acid demonstrated dramatic reductions in resistivity of the undesired particles over the entire temperature range tested. At all temperatures tested, the resistivity could be decreased to the optimal $10^{10}$ ohm-centimeter range. It is not believed that the corn syrup impacted undesired particle resistivity, only cohesivity.

Figure 7:
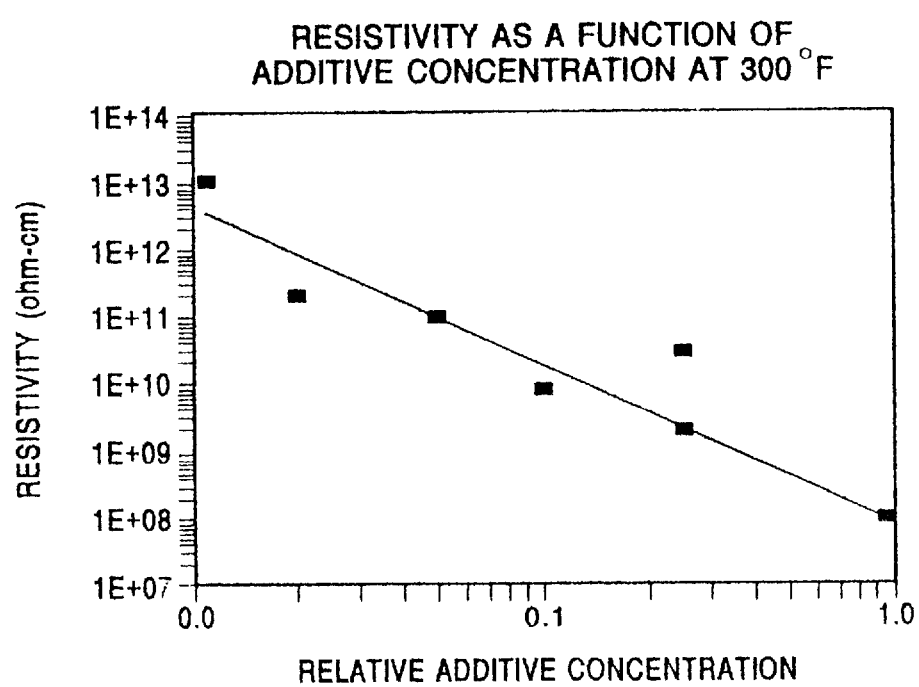
Figure 8:
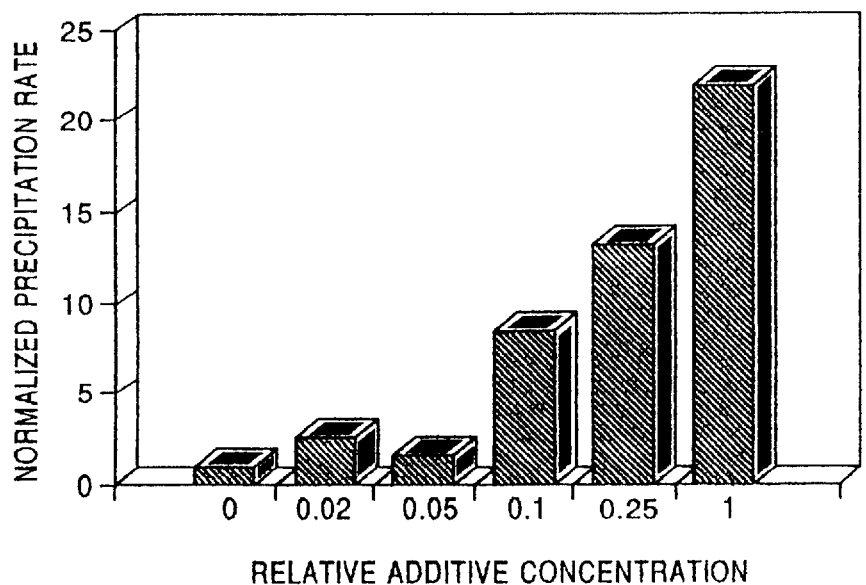

A plot of phosphoric acid concentration and resistivity at a constant temperature of 300° F. is illustrated in FIG. 7. The impact of the phosphoric acid on undesired particle resistivity ranges from about 2 to over 4 orders of magnitude reduction relative to the resistivity of untreated undesired particles. Similar results were experienced for other temperatures of the flue gas stream. In summary, significant reductions in fly ash resistivity were measured for all temperatures in the test matrix. The reduction of resistivity was demonstrated over a very broad range of temperatures bracketing virtually all existing cold-side electrostatic precipitators. The measured resistivity of additive-treated undesired particles ranged from the low $-10^8$ to mid $-10^{10}$ ohm-centimeters across the spectrum of temperatures included in the test matrix. FIG. 8 plots the rate of undesired particle collection in the resistivity apparatus against relative phosphoric acid concentration. The rate of agglomerate formation was found to increase with increasing phosphoric acid concentration. This result is believed to be due to not only improved (e.g., reduced) resistivity but also to improved cohesivity in the agglomerate caused by the phosphoric acid and corn syrup.

EXAMPLE 3

A 300 acfm slip stream of the off gas from a trial burn of a Powder River Basin coal in an electrostatic precipitation pilot plant was conditioned in a large spray contact chamber. A mixture of phosphoric acid and corn syrup was injected into the spray contact chamber upstream of the electrostatic precipitator. During the test, the injection nozzle was switched between chamber top and bottom to judge the effects of residence time on additive performance.

The pilot plant also supplied a fabric filter test device downstream of the spray chamber. The inlet to the fabric filter test device branched off at the electrostatic precipitator inlet. The electrostatic precipitator was instrumented to continuously monitor voltage, current, flowrate, temperatures and outlet particulate emissions. In addition, at each set of test conditions, both a "clean plate" and "dirty plate" voltage/current curve was taken manually. Resistivity was measured continuously at the electrostatic precipitator inlet with a measurement frequency of less than 30 minutes. Resistivity samples were collected by filtering across an electrically isolated metal frit, rather than by point-plane precipitation.

After the initial baseline experiment, the mixture was injected into the bottom of the large spray contact chamber with a fine atomizing spray nozzle oriented downstream. This produced a 10° F. spray cooling of the flue gas stream. Residence time to the electrostatic precipitator inlet at this location was about 2 seconds. Gas velocity in the chamber was less than 1 foot per second. Conditioning with phosphoric acid reduced the ash resistivity to $9 \times 10^9$ ohm-centimeters. The electrical current density improved to 2 nA/cm$^2$ with a baseline unconditioned agglomerate layer still on the plates. The plates were rapped clean and conditioning with phosphoric acid continued at the same rate. Once an agglomerate had accumulated, electrostatic precipitator current density increased to 8 nA/cm$^2$.

Spray injection was then switched to water at the same flow rate. Resistivity returned to $4 \times 10^{11}$ ohm-centimeters, essentially a repeat of the baseline measurement. Electrostatic precipitator electrical conditions also began to degrade. This confirmed that the improved electrical conditions during additive injection were not a result of water spray cooling. Next, the mixture was injected at a concentration 10 times lower than for the previous test. At this rate, there was no measurable improvement in resistivity from baseline. An intermediate concentration between the high and low was then injected. Resistivity was measured at $1 \times 10^{11}$ ohm-centimeters for this condition. Electrical current density increased slightly over the baseline with water spray.

Next, the nozzle was moved to the top of the spray chamber and the nozzle configuration was changed to a cluster head with 5 nozzles to determine the effects of residence time and spray droplet size on conditioning. Residence time at this location was increased by more than 12 seconds from the previous test. Conditioning with phosphoric acid from the spray chamber bottom decreased fly ash resistivity to $1.6 \times 10^9$ ohm-centimeters. However, during this test the combustor heat exchanger was beginning to plug, which reduced the particulate loading to the spray chamber/electrostatic precipitator. It was concluded that the additional residence time in the spray chamber was not required to achieve good conditioning with phosphoric acid.

Figure 9:
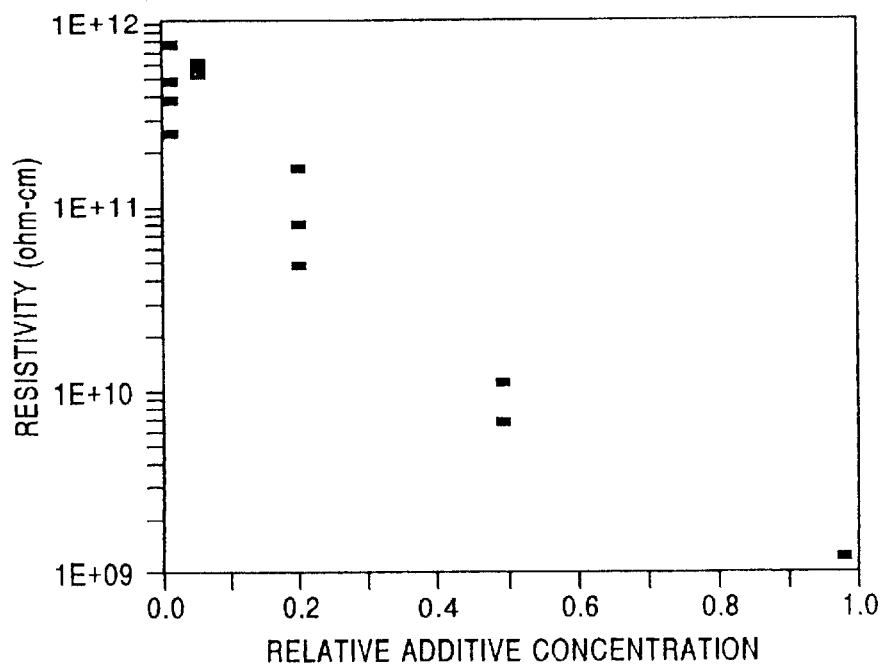

FIG. 9 shows fly ash resistivity as a function of phosphoric acid concentration at 300° F. Phosphoric acid concentration is expressed in relative terms linearly related to mass of the additive to the total weight of entrained undesired particles. In the experiments, outlet mass emissions were measured continuously by an optical monitor which responds proportionately to back-scattered light from entrained undesired particles in the gas stream. The monitor response decreased from 9% to less than 6% due to conditioning.

EXAMPLE 4

After establishing the viability of the mixture of phosphoric acid and corn syrup in reducing particulate emissions in the laboratory and in the pilot plant, the effectiveness of the mixture was evaluated under typical duct conditions. Flue gas was extracted isokinetically from an 18 inch diameter duct supplying a particulate control pilot plant in operation at a power plant. The slip stream was extracted from the plant duct downstream of the air heater and upstream of a reverse gas baghouse. An atomizing spray nozzle manifold was inserted into the slip stream duct approximately 40 feet in a 90 degree bend upstream of a sample probe. Liquid feed to the nozzle manifold was controlled with a peristaltic pump. Atomizing air pressure was set to a constant 80 psig. The sample probe drew flue gas isokinetically to a portable electrostatic precipitator at a flowrate of approximately 60 acfm. In all, sample residence time from injection to the electrostatic precipitator inlet was less than 2 seconds. Velocity in the duct was 50–60 feet per second and the gas temperature was 250° F. The sample was reheated to a constant 300° F. at the electrostatic precipitator inlet.

The portable electrostatic precipitator was configured as a single channel wire/plate at a 9 inch plate spacing with standard 0.1 inch diameter bare wires. Special teflon baffles were installed around and beneath the collection plates to minimize sneakage. The flowrate was set to give an SCA of 180 square feet/kacfm.

Figure 10:
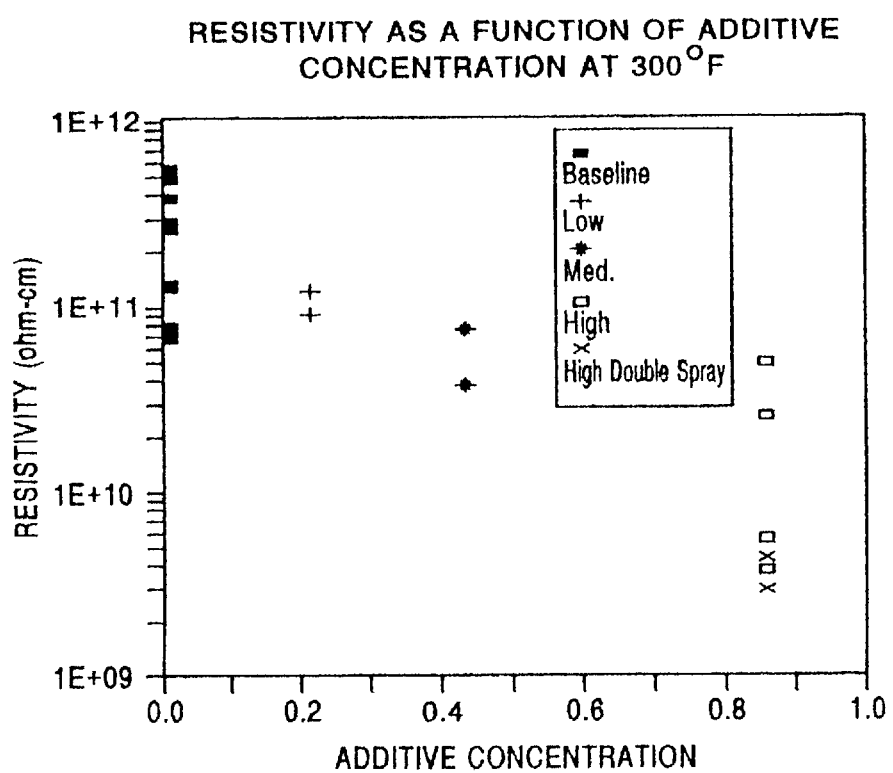

Electrostatic precipitator voltage and current were monitored continuously and voltage/current curves were taken to sparking for each test condition. Multiple resistivity measurements were taken at the electrostatic precipitator inlet for each test condition. Outlet particulate concentrations were monitored by a TRIBOFLOW monitor, which produces a response proportional to the number of charged particles contacting a probe. FIG. 10 presents the resistivity measurements taken during the test. Baseline resistivity at 300° F. was mid $-10^{11}$ ohm-centimeters. The additives were injected at 3 different phosphoric acid concentrations. Conditioning with phosphoric acid at the high concentration on the first test day reduced the resistivity to mid $-10^{10}$ ohm-centimeters. Conditioning on the following day at the same concentration reduced the resistivity to mid $-10^9$ ohm-centimeters. It is believed that this difference is the result of a change in nozzle alignment. At the high phosphoric acid concentration, the condition was also repeated by doubling liquid flow and halving additive solution concentration. This had no apparent effect on performance. At the high phosphoric acid concentration, the condition was also repeated by doubling liquid flow to the nozzle array and halving solution concentration. These measures had no apparent effect on performance. Conditioning with phosphoric acid at the high concentration reduced the resistivity to mid $-10^9$ ohm-centimeters. At the high rate, two tests showed a mid $-10^{10}$ resistivity, while all of the tests on the following day at the same injection rate were an order of magnitude lower. It is believed that this difference was a result of the change in nozzle alignment.

TRIBOFLOW monitor response was set to 0–20% full-scale. During injection at high concentration over a 2 hour period, the TRIBOFLOW monitor response dropped from 2.75% to 1.75%. After injection stopped, the response increased to 2.5%, indicating an increase in charged undesired particles exiting the electrostatic precipitator. During rapping periods the TRIBOFLOW response increased off scale (greater than 20%). The portable electrostatic precipitator was manually adjusted to higher power levels twice during additive injection. Attempts to increase power to the same power levels at baseline were spark-limited. The change in TRIBOFLOW response and the ability to increase power demonstrated a qualitative improvement in electrostatic precipitator performance from baseline to conditioning with phosphoric acid, consistent with the decrease in fly ash resistivity.

This test demonstrated that the additives could be applied as an aqueous conditioning agent through a fine atomizing nozzle array at typical duct conditions, rather than in a separate additive chamber. It was further concluded that: (i) aqueous additives solutions can be successfully injected into a turbulent flue gas stream at 40–60 foot per second gas velocity; (ii) liquid droplet size for the nozzle array was less than 40 microns Sauter Mean Diameter; (iii) a residence time of 1–2 seconds between injection and control device was adequate; (iv) flue gas spray cooling is 5°–10° F. for the conditioning rates required with the additives; and (v) effective spray distribution is critical to the success of conditioning.

Based on the above-noted tests, the mixture of additives was found to provide increased undesired particle cohesivity and agglomerate porosity and tensile strength relative to untreated undesired particles/agglomerates. The phosphoric acid additive in the mixture was found to provide more desirable undesired particle resistivities for electrostatic precipitator applications. The tests further indicated that undesired particle conditioning to improve resistivity can be effective over a wider temperature range than conventional additives, such as sulfur trioxide.

EXAMPLE 5

Figure 11:
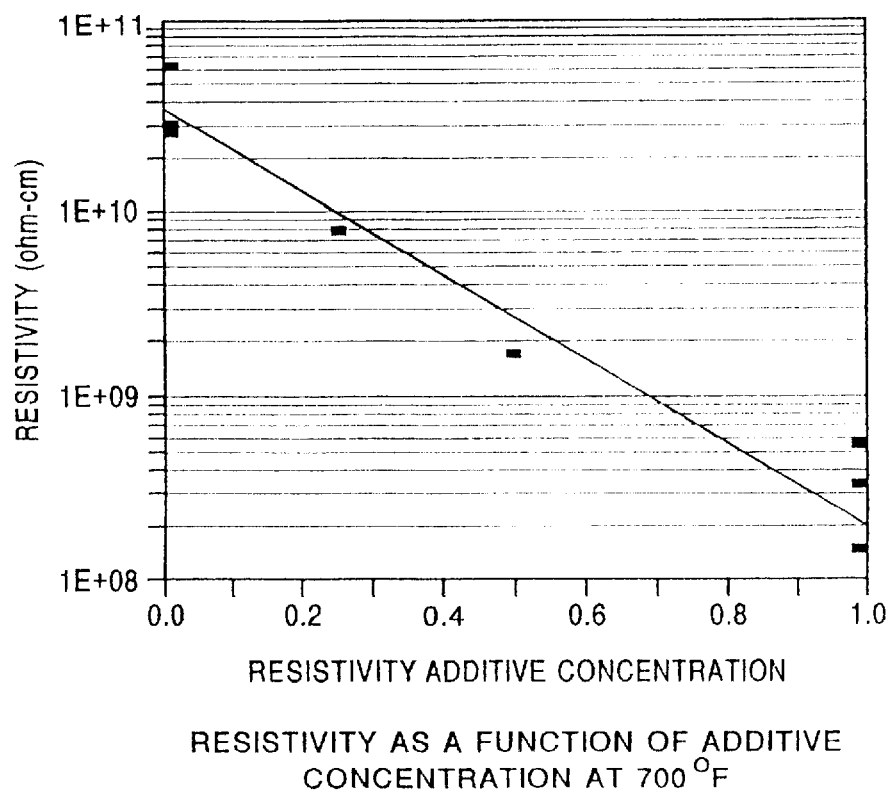

A test was conducted to determine if the mixture of phosphoric acid and corn syrup could alleviate electrostatic precipitator performance problems associated with sodium ion depletion in agglomerates deposited on hot-side electrostatic precipitator collection plates. It was believed that such conditioning could extend surface conduction in undesired particles to temperatures normally dominated by volume conduction. In the test, the experimental device used in Example 2 above was employed. The test was conducted at a flue gas temperature of 700° F. in a 10% moisture, air environment. The undesired particles were from an ash sample from a hot-side electrostatic precipitator at a plant firing a western sub-bituminous coal. As can be seen from FIG. 11, the mixture reduced undesired particle resistivity by up to 2 orders of magnitude. It was thus determined that the amount of resistivity reduction can be controlled by the concentration of phosphoric acid under hot-side conditions.

Further laboratory resistivity tests were conducted using a mixture of 75% $SiO_2$ and 25% $Al_2O_3$ powder. This synthetic undesired particle mix was created to entirely eliminate alkali ion charge carriers from the agglomerate and thereby present a worst-case undesired particle condition. The mixture of refractory powders was redispersed on the resistivity measurement frit to form a powder layer (e.g., agglomerate) and was heated to 700° F. in a 10% moisture gas stream. The powder layer was conditioned by injecting a liquid additive as an aqueous spray in the spray additive chamber upstream of the resistivity measurement cell at 700° F. Additive was brought into contact with the powder layer by drawing sample gas through the powder layer in the porous sample frit. Baseline tests were also conducted with no flue gas conditioning by injecting a water spray. Resistivity of the undesired particles was $4\times10^{9}$ ohm-centimeters. Conditioning with phosphoric acid successfully lowered resistivity by an order of magnitude to $4\times10^{8}$ ohm-centimeters. While the unconditioned powder layer at this temperature exhibited only moderate resistivity, the test demonstrated that the phosphoric acid can effectively reduce resistivity independent of sodium or lithium ion charge carriers at hot-side conditions.

EXAMPLE 6

A fabric filter test was conducted on a flue gas slipstream taken upstream of an existing particulate control device at a utility power plant firing a Texas lignite coal. The test equipment consisted of a sample probe, an additive contact chamber, an additive injection assembly, and a filter test device. Flue gas was extracted isokinetically from the host plant duct through the sample probe. The host duct temperature at the inlet extraction location ranged from 360° to 400° F. The filter chamber temperature and the additives contact chamber were maintained at 400° F. for all tests. In the additives contact chamber, an aqucous solution of diluted additive was atomized and injected into the flue gas stream using a small, dual-fluid nozzle. Additive liquid flowrate was metered and controlled with a precision peristaltic pump. For the bench-scale additive tests, the filter device was configured for reverse-gas cleaning with an 8-inch diameter fiberglass bag of a weight and weave to match the bags currently in use in the shake/deflate baghouse of a weight and weave to match the bags currently in use in the shake/deflate baghouse of the host power plant. Relative outlet particulate emissions were measured using a TRIBOFLOW™ monitor installed downstream of the filter chamber. Mass concentration measurements in the filter chamber inlet line during the baseline tests indicated a loading of 11 gr/acf.

The phosphoric acid/water solution was injected at a constant rate during the test series. The phosphoric acid solution concentration was incrementally increased, noting the performance at each concentration for at least 4 hours. At very low concentrations a 60% decrease in outlet particle loading was measured. As the concentration was increased, the cleaning frequency decreased and further reductions in outlet emissions occurred. Table 1 summarizes the test results.

TABLE 1

Additive Fabric Filter Test Results

| Solution Concentration weight % additive/ash | Time to pressure initiated clean % increase to baseline | Reduction in Emissions % change to baseline |
|---|---|---|
| 0.025 | No Change | No Change |
| 0.05 | No Change | 60% |
| 0.075 | 50–75% | 60–99% |
| 0.10 | 100% | 60–99% |
| 0.15 | 200% | 80–90% |
| 0.20 | 400% | 99% |

As can be seen from Table 1, even small amounts of phosphoric acid relative to the undesired particle concentration in the gas stream significantly reduces the particulate emissions.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A process for removing undesired particles from a gas stream, comprising:
    contacting said gas stream with a plurality of liquid droplets comprising a fluid composition including liquid phosphoric acid and a liquid carrier fluid, wherein said liquid droplets have a first Sauter Mean Diameter ranging from about 20 to about 150 microns;
    maintaining, after the contacting step, at least most of the liquid phosphoric acid in the liquid droplets in the liquid phase while separating said liquid carrier fluid from said liquid droplets to reduce said liquid droplet size to a second Sauter Mean Diameter less than said first Sauter Mean Diameter; and thereafter collecting said undesired particles and liquid phosphoric acid on a collection surface to form an agglomerate, wherein said liquid phosphoric acid alters at least one of the undesired particle resistivity and undesired particle cohesiveness.

2. The process as claimed in claim 1, wherein said second Sauter Mean Diameter ranges from about 1 to about 10 microns.

3. The process as claimed in claim 1, further comprising before said contacting step:

contacting said fluid composition with a gas in a nozzle to atomize said fluid composition wherein in the maintaining step, all of the liquid phosphoric acid in the liquid droplets is maintained in the liquid phase.

4. The process as claimed in claim 1, wherein the amount of phosphoric acid contacted with said gas stream is sufficient to produce an amount of phosphoric acid in said gas stream ranging from about 0.5 to about 10 lb/ton of the undesired particles contained in said gas stream.

5. The process as claimed in claim 1, wherein the residence time of said liquid droplets in said gas stream before said collecting step ranges from about 0.25 to about 2.00 seconds.

6. The process as claimed in claim 1, wherein said fluid composition comprises an adhesive other than phosphoric acid.

7. The process as claimed in claim 1, wherein the first Sauter Mean Diameter ranges from about 20 to about 100 microns.

8. The process as claimed in claim 1, wherein the collection surface is an electrically charged plate and the amount of phosphoric acid contacted with said gas stream is sufficient to produce an amount of phosphoric acid in said gas stream ranging from about 1.0 to about 10 lb/ton of the undesired particles contained in said gas stream.

9. The process as claimed in claim 1, wherein the collection surface is a filtration surface and the amount of phosphoric acid contacted with said gas stream is sufficient to produce an amount of phosphoric acid in said gas stream ranging from about 0.5 to about 6.0 lb/ton of the undesired particles contained in said gas stream.

10. The process as claimed in claim 1, wherein the gas stream is substantially free of vaporized phosphoric acid derived from the liquid droplets.

11. The process claimed in claim 1, wherein, in the maintaining and the thereafter collecting steps, the gas stream is substantially free of phosphoric acid vapor.

12. The process claimed in claim 1, wherein the liquid phosphoric acid is substantially non-vaporizable at the temperature of the gas stream.

13. The process as claimed in claim 1, wherein, when the liquid phosphoric acid and undesired particles contact the collection surface, the at least most of the liquid phosphoric acid and undesired particles are separate from one another.

14. The process as claimed in claim 1, wherein, when the liquid phosphoric acid and undesired particles contact the collection surface, the liquid phosphoric acid is in the liquid phase.

15. The process as claimed in claim 1, wherein the liquid phosphoric acid is substantially free of phosphoric acid vaporization and condensation during the contacting, maintaining and thereafter collecting steps.

16. The process as claimed in claim 1, wherein the collection surface has a temperature greater than the dew point of water.

17. A process for removing undesired particles from a gas stream, comprising:

contacting said gas stream with a plurality of droplets of liquid phosphoric acid to entrain said plurality of droplets in said gas stream, said plurality of droplets having a Sauter Mean Diameter ranging from about 1 to about 10 microns to suspend said plurality of droplets in said gas stream;

thereafter maintaining at least most of said plurality of droplets in the liquid phase while said plurality of droplets of liquid phosphoric acid are entrained in said gas stream; and thereafter contacting said undesired particles and plurality of liquid phosphoric acid droplets with a filtration surface to form an agglomerate on said filtration surface wherein the filtration surface has a temperature greater than the dew point of water.

18. The process as claimed in claim 17, further comprising before said first contacting step:

dispersing a plurality of droplets of a fluid composition in said gas stream, said fluid composition comprising a vaporizable carrier fluid and phosphoric acid, wherein the concentration of phosphoric acid in said fluid composition ranges from about 0.1 to about 5.0% by volume.

19. The process as claimed in claim 17, wherein the concentration of phosphoric acid in said gas stream ranges from about 0.5 to about 6.0 lb./ton of undesired particles.

20. The process as claimed in claim 17, wherein said first contacting step comprises:

dispersing a plurality of droplets of a fluid composition having a first Sauter Mean Diameter including said liquid phosphoric acid and a carrier fluid into said gas stream; and maintaining, after the dispersing step, the liquid phosphoric acid in the droplets in the liquid phase while separating said carrier fluid from said droplets to reduce said droplet size to said Sauter Mean Diameter.

21. The process as claimed in claim 20, wherein said first Sauter Mean Diameter is more than 10 microns.

22. The process as claimed in claim 20, wherein said gas stream when contacted with said filtration surface is substantially free of phosphoric acid vapor derived from the droplets.

23. The process as claimed in claim 17, wherein, when the plurality of droplets of liquid phosphoric acid and undesired particles contact the filtration surface, the plurality of droplets of liquid phosphoric acid and undesired particles are separate from one another.

24. The process as claimed in claim 17, wherein the liquid phosphoric acid is substantially free of phosphoric acid vaporization and condensation during the contacting, thereafter maintaining, and thereafter contacting steps.

25. A process for electrically removing undesired particles from a gas stream having a temperature above a critical temperature of the undesired particles and below the dew point of liquid phosphoric acid in the gas stream, comprising:

contacting said gas stream with a plurality of droplets of liquid phosphoric acid thereafter maintaining said plurality of liquid phosphoric acid droplets in the liquid phase; and thereafter collecting said undesired particles and plurality of liquid phosphoric acid droplets on a collection surface of an electrostatic precipitating device to form an agglomerate, wherein, said liquid phosphoric acid reduces the undesired particle resistivity and the collection surface has a temperature greater than the dew point of water.

26. The process as claimed in claim 25, further comprising before said first contacting step:

dispersing a plurality of droplets of a fluid composition in said gas stream, said fluid composition comprises a vaporizable carrier fluid and phosphoric acid, wherein the concentration of phosphoric acid in said fluid composition ranges from about 0.1 to about 5.0% by volume.

27. The process as claimed in claim 25, wherein said temperature is more than about 600° F.

28. The process as claimed in claim 25, wherein a sufficient amount of said phosphoric acid is contacted with said gas stream to produce an amount of phosphoric acid in said gas stream ranging from about 0.1 to about 1.0% by weight of said undesired particles contained in said gas stream.

29. The process as claimed in claim 25, wherein said first contacting step comprises:

dispersing a plurality of droplets of a fluid composition having a first Sauter Mean Diameter including said phosphoric acid and a carrier fluid into said gas stream; and maintaining, after the dispersing step, a substantial portion of the liquid phosphoric acid in the droplets in the liquid phase while separating said carrier fluid from said droplets to reduce said droplet size to said Sauter Mean Diameter.

30. The process as claimed in claim 29, wherein said first Sauter Mean Diameter is at least about 20 microns.

31. The process as claimed in claim 29, wherein said fluid composition comprises an organic adhesive.

32. The process as claimed in claim 25, wherein the critical temperature is no less than about 350° F.

33. The process as claimed in claim 25, wherein the gas stream temperature is no less than about 450° F.

34. The process as claimed in claim 25, wherein the plurality of droplets has a Sauter Mean Diameter ranging from about 1 to about 10 microns.

35. The process as claimed in claim 25, wherein the first contacting step comprises:

dispersing a plurality of first droplets comprising phosphoric acid and a carrier fluid into the gas stream, the droplets having a first Sauter Mean Diameter ranging from about 20 to about 150 microns, and removing the carrier fluid from the first droplets to form the plurality of droplets.

36. The process as claimed in claim 25, wherein the first contacting step comprises:

injecting the liquid phosphoric acid into the gas stream; and maintaining the liquid phosphoric acid in liquid form after the injecting step.

37. The process as claimed in claim 25, wherein the temperature is sufficient for the undesired particles to be in the volume conduction region.

38. The process as claimed in claim 25, wherein the temperature is less than about 1,400° F.

39. The process as claimed in claim 25, wherein the gas stream, during the first collecting step, is substantially free of phosphoric acid vapor derived from the liquid droplets.

40. The process as claimed in claim 25, wherein, when the plurality of droplets of liquid phosphoric acid and undesired particles contact the collection surface, at least most of the plurality of droplets of liquid phosphoric acid and undesired particles are discrete from one another.

41. The process as claimed in claim 25, wherein the liquid phosphoric acid is substantially free of phosphoric acid vaporization and condensation during the contacting and collecting steps.

42. A process for removing undesired particles from a gas stream, comprising:

contacting said gas stream with a plurality of droplets comprising a fluid composition including liquid phosphoric acid;

maintaining thereafter the liquid phosphoric acid in the plurality of droplets in the liquid phase such that the gas stream is substantially free of vaporized phosphoric acid derived from the plurality of droplets; and collecting said undesired particles and liquid phosphoric acid on a collection surface to form an agglomerate wherein said liquid phosphoric acid alters at least one of the undesired particle resistivity and undesired particle cohesiveness and wherein the collection surface has a temperature greater than the dew point of water.

43. The process as claimed in claim 42, wherein the temperature is more than the boiling point of the carrier fluid.

44. The process as claimed in claim 42, wherein the fluid composition comprises a carrier fluid and the plurality of droplets have a first Sauter Mean Diameter in the contacting step and a second Sauter Mean Diameter after the maintaining step and the First Sauter Mean Diameter ranges from about 20 to about 150 microns and the Second Sauter Mean Diameter ranges from about 1 to about 10 microns.

45. The process as claimed in claim 42, wherein, when said liquid phosphoric acid and undesired particles contact the collection surface, at least most of the liquid phosphoric acid is separated from the undesired particles.

46. The process as claimed in claim 42, wherein the liquid phosphoric acid is substantially free of phosphoric acid vaporization and condensation during the maintaining and collecting steps.

47. A process of removing undesired particles from a gas stream, comprising:

contacting a gas stream containing undesired particles with a plurality of droplets comprising a liquid phosphorous-containing additive for altering at least one of the undesired particle resistivity and undesired particle cohesiveness;

maintaining, after the contacting step, at least most of the liquid phosphorous-containing additive in the plurality of droplets in the liquid phase; and collecting said undesired particles and liquid phosphorous-containing additive in the liquid phase on a collection surface to form an agglomerate wherein the collection surface has a temperature greater than the dew point of water and the liquid phosphorous-containing additive is substantially free of vaporization and condensation during the maintaining and collecting steps.

48. The process claimed in claim 47, wherein the droplets comprise a carrier fluid and have a first Sauter Mean Diameter in the contacting step and a second Sauter Mean Diameter in the collecting step and wherein the maintaining step comprises separating the carrier fluid from the droplets to reduce the droplet size to the second Sauter Mean Diameter that is less than the first Sauter Mean Diameter.

49. The process claimed in claim 48, wherein the first Sauter Mean Diameter ranges from about 20 to about 150 microns.

50. The process claimed in claim 48, wherein the second Sauter Mean Diameter ranges from about 1 to about 10 microns.

51. The process claimed in claim 47, wherein the liquid additive is phosphoric acid.

52. The process claimed in claim 47, wherein the collection surface has a temperature greater than the dew point of water.

53. The process as claimed in claim 47, wherein, when the liquid phosphorus-containing additive and undesired particles collect on the collection surface, at least most of the liquid phosphorus-containing additive is separate from the undesired particles.

54. A process for removing undesired particles from a gas stream, comprising:

contacting said gas stream with a plurality of droplets comprising a fluid composition including liquid phosphoric acid and a carrier fluid, wherein said plurality of droplets have a first Sauter Mean Diameter of more than about 20 microns;

vaporizing said carrier fluid from said plurality of droplets to reduce said droplet size to a second Sauter Mean Diameter of no more than about 10 microns while maintaining at least most of the liquid phosphoric acid in the liquid phase; and contacting said undesired particles and liquid phosphoric acid in the liquid phase on a collection surface to form an agglomerate, wherein the liquid phosphoric acid is substantially free of phosphoric acid vaporization and condensation during the vaporizing and contacting steps, wherein the collection surface has a temperature greater than the dew point of water, wherein, upon contact of the liquid phosphoric acid and undesired particles with the collection surface, at least most of the liquid phosphoric acid and undesired particles are free from contact with one another and wherein said liquid phosphoric acid alters at least one of the undesired particle resistivity and undesired particle cohesiveness.

* * * * *